United States Patent [19]

Fry

[11] 4,097,148
[45] Jun. 27, 1978

[54] MODE LOCKED LASER RANGE FINDER

[75] Inventor: Stephen M. Fry, Woodland Hills, Calif.

[73] Assignee: Hughes Aircraft Company, Culver City, Calif.

[21] Appl. No.: 744,531

[22] Filed: Nov. 24, 1976

[51] Int. Cl.² ............................ G01C 3/08; G01P 3/36
[52] U.S. Cl. ............................................ 356/5; 356/28
[58] Field of Search .................................. 356/4, 5, 28

[56] References Cited
U.S. PATENT DOCUMENTS

| 3,652,161 | 3/1972 | Ross | 356/5 |
| 3,765,768 | 10/1973 | Budin et al. | 356/5 |
| 3,945,729 | 3/1976 | Rosen | 356/5 |

Primary Examiner—S. C. Buczinski
Attorney, Agent, or Firm—Walter J. Adam; W. H. MacAllister

[57] ABSTRACT

A laser range finder utilizing a mode locked laser for measuring target range with a high degree of accuracy and simplicity by measuring the time of flight of a transmitted pulse utilizing the pulses in the laser cavity for clocking a range counter. The laser consists of mirrors with at least one being semi-reflective, an amplifying medium and a suitable method of mode locking. A switch is provided outside of the cavity for transmitting a gated train of ultra short pulses or a single pulse to a target. The return signal is processed, detected and sent to an electronic circuit which uses the detected signal to stop a counter at the proper range count. The pulses inside the cavity are detected after they pass through one of the mirrors to provide the range counting pulses as well as to energize the switch outside of the cavity at the proper switching time. Thus, the laser ranger in accordance with the invention does not require a separate oscillator and utilizes the oscillating pulse in the laser cavity to perform that function and provide extremely high range resolution.

9 Claims, 3 Drawing Figures

MODE LOCKED LASER RANGE FINDER

BACKGROUND OF THE INVENTION

1. Field of the Invention

This invention relates to laser range finders and particularly to a mode locked laser range finder that uses the natural mode-locking frequency as an accurate time base and an ultra short pulse or train of pulses to provide a high degree of range resolution.

2. Description of the Prior Art

A laser range finder that utilizes a mode locked laser is described in U.S. Pat. No. 3,737,231, George W. Low et al, entitled, "High Pulse Rate High Resolution Optical Radar System", in which an optical switch is provided inside the laser cavity to convert the polarization of the optical pulse which is then deflected out of the cavity toward the target. The system of this patent utilizes a portion of the oscillating pulse and a timing delay for controlling the polarization of the pulse in the cavity before it is deflected therefrom. Counting of the transit time of the transmitted pulses is performed by an external crystal oscillator. It would be a substantial advance to the art if a laser ranger were provided that could utilize the oscillating pulse to perform the crystal oscillator function.

SUMMARY OF THE INVENTION

The laser range finder, in accordance with the invention, utilizes a mode locked laser and a simplified and improved clock source. The laser pulse is detected by a pulse detector positioned between a semi-reflective cavity mirror and a transmission switch and is utilized to energize the transmission switch so as to allow sufficient time for the switch to respond to a subsequent cavity pulse passed through the semi-reflective mirror. The laser pulse after one or a selected number of round trip transit time in the cavity is then passed through the transmission switch and through optics to a target. This laser pulse and subsequent laser pulses are detected to clock a range counter. The light reflected or scattered from the target is collected by suitable optics and is then detected and sent to an electronic circuit which stops the range counter. The detected signal from each oscillation of the laser pulse in the cavity after transmission provides an accurate range count without requiring a separate crystal oscillator. The use of a mode locked laser and the resulting ultra short pulse allows extremely high resolution without sophisticated signal processing.

It is therefore an object of this invention to provide a high resolution laser range finder.

It is another object of this invention to provide a laser range finder that provides an accurate range count without a separate oscillator.

It is still another object of this invention to provide a laser range finder that accurately provides a delay time for energizing the switching arrangement.

It is a further object of this invention to provide a simplified and accurate laser range finder that will operate with a wide variety of laser amplifying media.

BRIEF DESCRIPTION OF THE DRAWINGS

These and other objects, features and advantages of the invention as well as the invention itself will become apparent to those skilled in the art in the light of the following detailed description taken in consideration with the accompanying drawings wherein like referenced numerals indicate like or corresponding parts throughout the several views wherein.

DESCRIPTION OF THE PREFERRED EMBODIMENT

Figure 1:
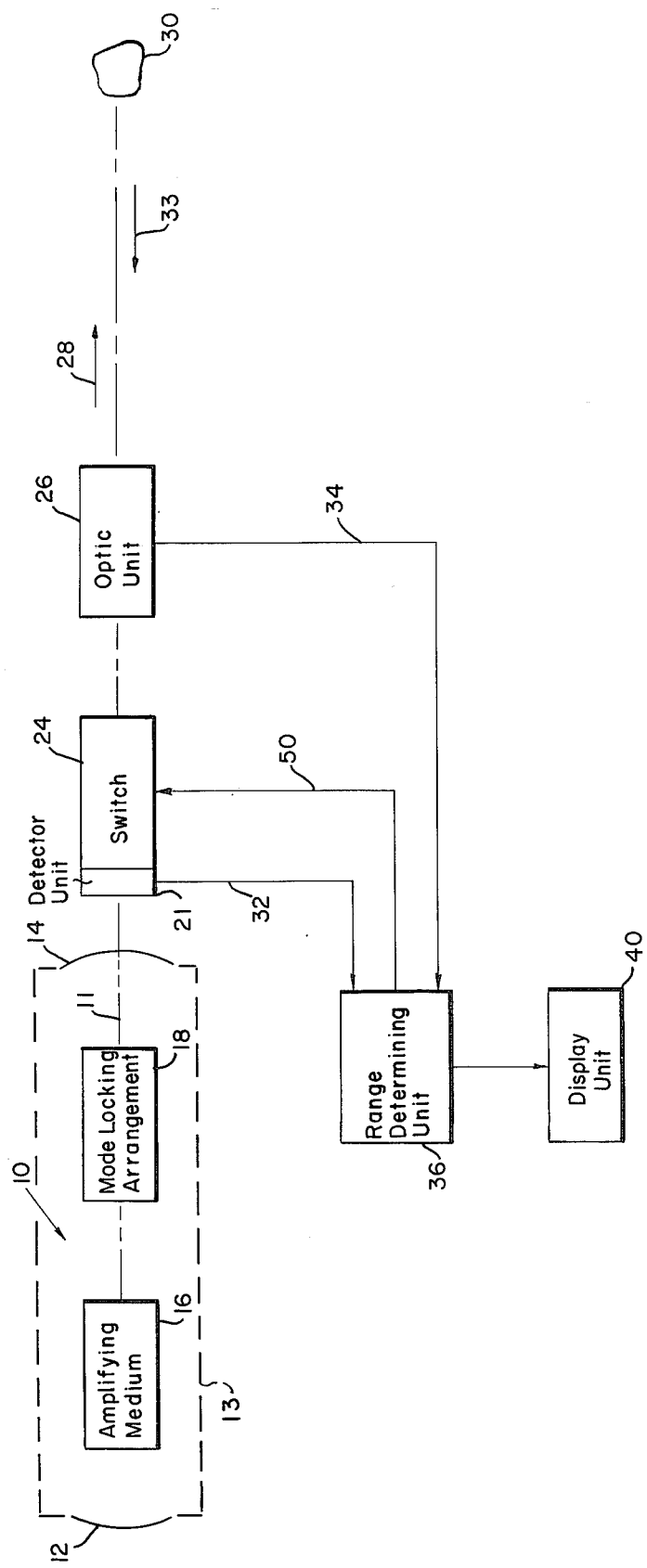
FIG. 1 is a schematic block diagram showing the mode locked laser range finder in accordance with the invention.

Referring first to FIG. 1, a laser 13 having an optical axis 11 includes mirrors 12 and 14 for forming a cavity 10 which includes an amplifying medium 16 and a mode locking arrangement 18 which, for example, may be a saturable absorber or electro-optic switch. The mirror 14 is a semi-reflective mirror and the mirror 12 may be a totally reflective mirror. The amplifier 16 may be any suitable laser amplifier using materials such as $CO_2$, YAG, dye, helium neon, or ruby; configurations such as large bore tube, crystal, or waveguide; being appropriately pumped by electric discharge, RF source, electron injection, optical output of a flash lamp, by another laser, or other suitable source as is well known in the art. At the output of the cavity along the axis 11 is a detector unit 21 and suitable switch 24 for passing pulses of energy to an optic unit 26 and in turn as indicated by an arrow 28, to an object or target 30. The reflected energy indicated by an arrow 33 passes into optic unit 26 where, after detection, a signal is applied through a lead 34 to range determining unit 36 which also receives detected pulses from the detector unit 21 on a lead 32. Each pulse output from the detector unit 21 represents a round trip transit time of the oscillating pulse in the cavity 10. The range count is applied to a display unit 40 from the range determining circuit 36 which, because of the use of the detected mode locked pulses from the cavity 10 as counter clock pulses, provides a highly accurate range measurement.

Figure 2:
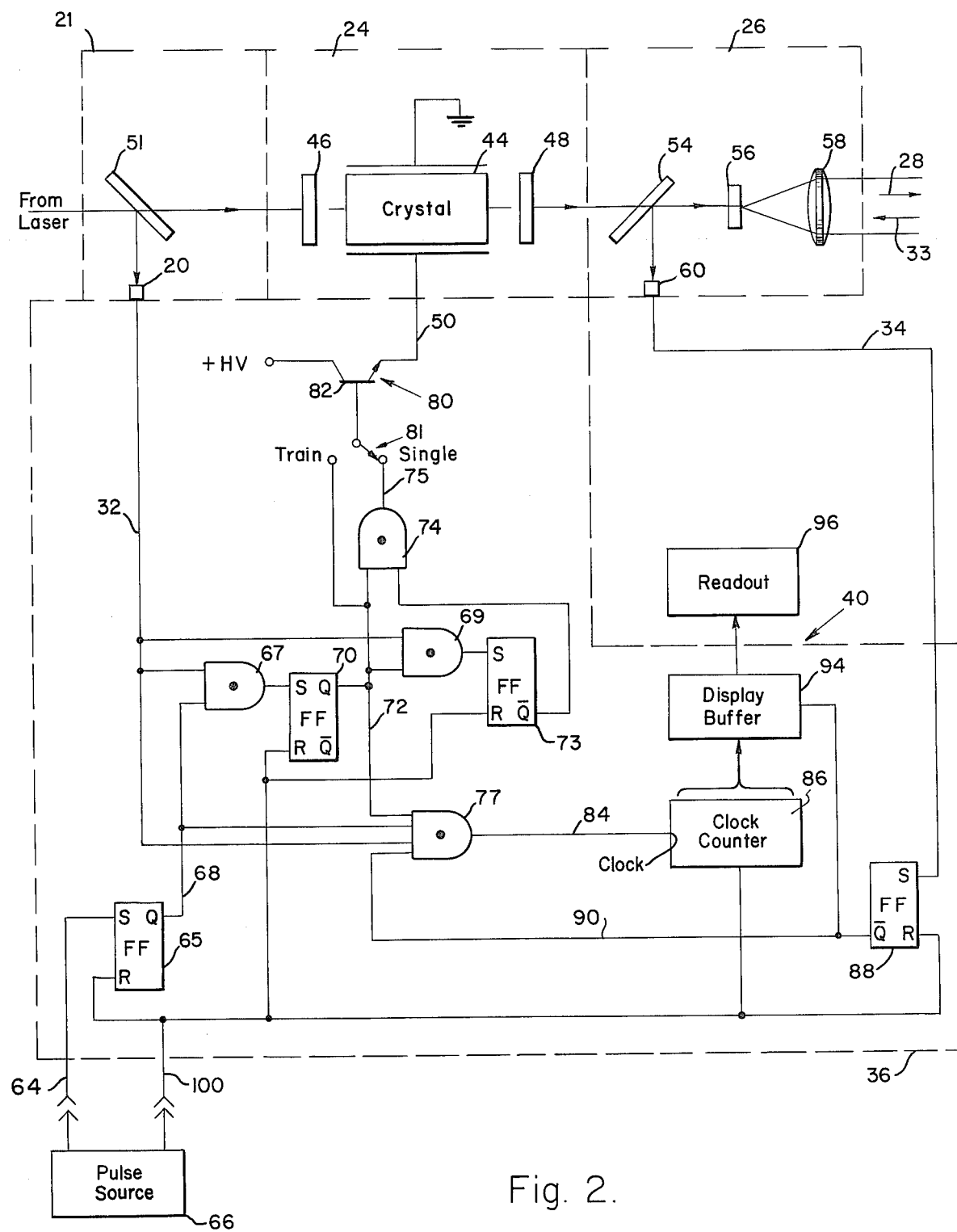
FIG. 2 is a schematic block, optical, and circuit diagram for explaining the transmission and reception optical path and control circuitry in further detail.

Referring now to FIG. 2, the detector unit 21 includes a semi-reflective mirror 51 reflecting energy to a pulse detector 20 which applies detected pulses to the lead 32. The mirror 51 and pulse detector 20 form a pulse detecting means. The switching unit 24 may be any suitable arrangement for blocking the transfer of the pulses from the cavity 10 and is illustrated as including an electro-optical crystal 44 with a wire grid polarizer 46 polarized in a first direction as the input and wire grid polarizer 48 polarized in a second direction at its output. In response to a signal applied to the crystal 44 on a lead 50, the polarized light is rotated to an angle which can pass through the polarizer 48. If the cavity 10 provides a polarized pulse such as by utilizing Brewster windows in the amplifier 16, the polarizer 46 is not required. A transmitted pulse or a train of pulses is then applied to the optic unit 26. Inside this unit, the pulse(s) passes through a semi-reflective mirror 54 and through a double convex lens 56 where the energy diverges to a colimating lens 58 for transmission toward the target. Return energy after passing through the colimating lens 58 and the lens 56 is applied to the semi-reflected mirror 54 and is reflected to a detector 60 pulse for controlling the range determining unit 36 of FIG. 1 which is shown in further detail in FIG. 2 as an illustrative example of an arrangement that may be utilized in accordance with this invention for developing an accurate range count. The semi-reflective mirror 54 and pulse detector 60 form a return pulse detecting means.

A pulse source 66 which for example may be the synchronizing arrangement in a fire control system or a display system, for example, applies pulses on a lead 64 to a flip-flop 65. The output of the flip flop 65 is coupled on a lead 68 through an AND gate 67 to the set terminal of an SR flip-flop 70. In the presence of a pulse on the lead 32, the flip-flop 70 applies a positive level through a lead 72 to AND gates 69 and 74. The AND gate 74 and the lead 72 are coupled to a switch 80 through a switch 81 having a train position and a single pulse position. The flip-flop 70 when set maintains a positive level on the lead 72 during the transmission period and the gate 74 maintains a positive level on a lead 75 for only one detected pulse period. The AND gate 69 in response to a positive level on the lead 72 and a detected pulse on the lead 32 sets an SR flip-flop 73 which applies a low level to the AND gate 74 which in turn generates a low level signal on the lead 75 preventing subsequent pules from passing through the gate 24. Because of the delay through the gate 69 and the flip-flop 73, the high level on lead 72 allows a transistor 82 of the switch 80 to apply the +HV potential through the lead 50 to the switch 24 for only a period to allow passing of a single laser transmission pulse. An AND gate 77 has its input coupled to the leads 68, 32 and 72 and to a lead 90 for passing detected pulses through a lead 84 to the clock input of a counter 86. The delay in the gate 67 and flip-flop 70 prevents a first detected pulse from passing to the counter 86 but all subsequent pulses during a range measuring interval are applied to the clock input of the counter 86.

For terminating the range count, an SR flip-flop 88 has its set input terminal coupled to the lead 34 and its Q output coupled to the lead 90 and in turn to an input of the gate 77. The potential level on the lead 90 is high until a receive or return pulse is detected which then inactivates the gate 77 as well as transferring the contents of a display buffer 94 to a readout unit 96.

For resetting the system prior to another transmission of a pulse or a train of pulses, the pulse source 66 applies a reset pulse on a lead 100 to reset the flip-flops 65, 70 and 73, to reset the flip-flop 88 so that a high level is again applied to the lead 90, and to reset the counter 86. Thus, the illustrated system can selectively transmit either a single pulse or a train of pulses. It is to be understood that the invention is not to be limited to the illustrated arrangement of FIG. 2 but includes all suitable control arrangements for providing the functions in accordance with the invention.

Figure 3:
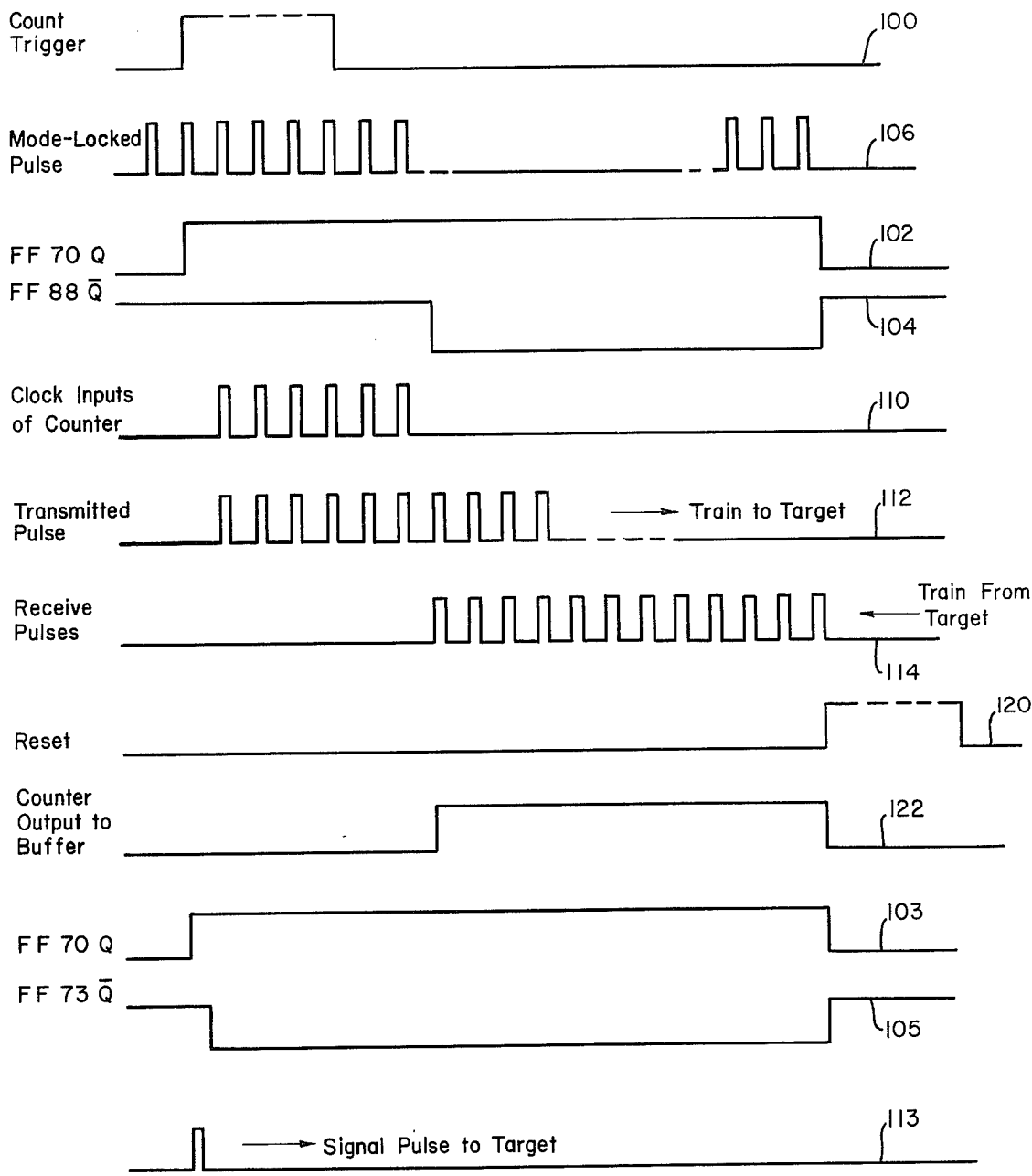
FIG. 3 is a schematic diagram showing waveforms of voltage as a function of time for further explaining the operation of the system of FIG. 1.

Referring now to FIG. 3 as well as to FIG. 2, the count trigger pulse of a waveform 100 is applied to the gate 67 and in response to a detected pulse of the mode locked pulses of a waveform 106, the flip-flop 70 changes to the Q-state as shown by a waveform 102 so that a high level is provided on lead 72. The flip-flop 88, being reset, is in the positive state at its Q output as shown by a waveform 104. The train of mode locked pulses at detector 20 in the laser cavity is continuous as shown by the waveform 106 and in response to the high level of the waveform 102 activating the gate 77, the detected pulses from pulse detector 20 are applied through the AND gate 77 to the counter 86 as shown by a waveform 110. A train of laser pulses as shown by a waveform 112 is passed through the switch 24 and through the optics for transmission toward the target when the switch 81 is in the position for transmitting a train of pulse. When the switch 81 is in the illustrated position, the flip-flop 70 is in the set state as shown by a waveform 103 and a single pulse of a waveform 113 is transmitted to the target because of the setting of the flip-flop 73 as shown by a waveform 105. The reflected pulses or pulse are received as shown by a waveform 114 with the first pulse in time from the pulse train being detected to set the flip-flop 88 and thus terminate the clock input of the counter as shown by the waveform 110.

It is to be noted that the first pulse of the waveform 106 after the flip-flop 70 is energized is not transmitted and the detected first pulse is not applied to the clock input of the counter 86 as shown by the waveform 110. The two-way transit of the pulse in the cavity provides time to energize the switch 24 and the second pulse is transmitted as well as being detected and applied to the counter 86 as the first clock input. By utilizing the first pulse from the detector 20 when the oscillating pulse is at the mirror 14 to energize the switch 24, the system of the invention allows the electro-optic cyrstal 44 sufficient time to be energized so as to be fully operative as a polarizer when the laser pulse after a round-trip transit time is passed through the mirror 14. At the return time of the first transmitted pulse as detected by the receive pulse detector 60, the output of the flip-flop 88 goes low to terminate the transfer of detected pulses to the counter 86 and the counter value is transferred into the display buffer 94 as indicated by a waveform 122. The voltage of the waveform 104 remains at a low level until it is reset by a reset pulse of a waveform 120 from the pulse source 66. The reset pulse of the waveform 120 also resets the other flip-flops and the counter 86 so that the system is again ready to start the counting operation, transmit another pulse or train of pulses and determine the range count when the detector 60 responds to the return pulse.

In the system of the invention it is possible to resolve distances on the order of $C\tau$ where $\tau$ is the width of an ultra-short pulse and since $\tau$ can be made by using appropriate laser sources and mode locking of many modes, quite small (0.6 manosecond to approximately 10 ps) extremely good resolution of target distance of much less than a foot can be obtained. By counting the ultra-short pulses, the need for a separate clock oscillator is eliminated and the range unit and accuracy is controlled by adjusting and stabilizing the laser cavity length. The accuracy of the laser cavity length can be further controlled by utilizing suitable materials for the mounting enclosure of the mirrors and by bonding the mirrors to the enclosure by bonding material that matches the expansion coefficient material of the enclosure. For example, INVAR may be utilized for the enclosing tube; this, and suitable other materials, has an extremely small temperature coefficient so that there is little change in dimensions of the cavity with temperature. The system of the invention is illustrated in one operating arrangement with a train of pulses being transmitted, but range ambiguity is eliminated in accordance with the invention because the first return pulse is detected and this pulse is used to stop the range counter. By proper selection of the laser source, the system of the invention allows extremely high repetition rates to be achieved.

Thus, there has been described a mode locked laser range finder that by comparing the return pulse or pulses to the pulses in the laser cavity resolves very short distances. By utilizing the detected pulses in or from the laser cavity, the need for a separate crystal oscillator is eliminated thus considerably simplifying the system.

What is claimed is:

1. A laser range finder comprising:
   a mode locked laser having a cavity for providing mode locked laser pulses oscillating in said cavity along an optical path;
   switching means positioned external to said cavity in said optical path for passing at least one of said laser pulses therethrough;
   optical means positioned in said optical path for transmitting at least one of said laser pulses passed through said switching means toward an object, and including first pulse detector means for detecting a pulse returned from said object;
   second pulse detector means positioned between said cavity and said switching means for detecting said laser pulses coming from said cavity; and
   counting means coupled to said first pulse detector means and said second pulse detector means for providing range counts during a counting interval.

2. The combination of claim 1 further including control means for controlling said switching means to pass a train of said laser pulses during said counting interval.

3. The combination of claim 1 further including control means for controlling said switching means to transmit a single laser pulse.

4. A laser range finder comprising:
   a mode locked laser having first and second end mirrors positioned along a portion of an optical axis and providing laser pulses oscillating between said first and second end mirrors;
   first pulse detector means positioned along said optical axis for detecting said laser pulses passing through said first end mirror along said optical axis;
   switching means positioned adjacent to said first pulse detector means along said optical axis for passing said laser pulses to an object in space;
   second pulse detector means for detecting return pulses; and
   means coupled to said first pulse detector means and said second pulse detector means for comparing the detected return pulses with the detected laser pulses to develop a range count.

5. The combination of claim 4 further including a counter responsive to the pulses from said first pulse detector means and gating means coupled between said first pulse detector means and said counter and being responsive to said second pulse detector means for stopping said counter.

6. The combination of claim 5 in which said counter has a clock input and in which said gating means is coupled to the clock input of said counter to provide the counter clock signals.

7. A laser range finder comprising:
   a laser cavity having along an optical axis, first and second end mirrors, amplifying means and mode locking means;
   first pulse detector means positioned external to said cavity for detecting pulses passing from said cavity along said optical axis;
   switching means positioned along said optical axis adjacent to at least a portion of said first pulse detector means for passing pulses therethrough;
   optical means positioned along said optical axis adjacent to said switching means for transmitting pulses passed through said switching means, into space and receiving return pulses, said optical means including means for deflecting said return pulses;
   second pulse detector means positioned to receive the deflected return pulses;
   first gating means coupled to said first pulse detector means;
   a counter having a clock input coupled to said first gating means; and
   second gating means coupled between said second pulse detector means and said first gating means.

8. The combination of claim 7, further including a pulse source and in which said first gating means includes first bistable means responsive to said pulse source, and a gate coupled to said first bistable means and to said first pulse detector means and coupled to said clock input, and said second gating means includes second bistable means coupled between said second pulse detector means and the gate of said first gating means for preventing pulses from said first pulse detector means from passing to said clock input in response to detection of a return pulse.

9. A system for determining range to an object comprising:
   a mode locked laser cavity for providing oscillating pulses therein along an optical axis and for providing laser pulses external to said cavity along said optical axis,
   first pulse detector means for responding to said laser pulses outside of said cavity and along said optical axis,
   switching means outside of said cavity and along said optical axis for passing said laser pulses for transmission to said object;
   second pulse detector means positioned to receive pulses returned from said object;
   counter means having a clock input; and
   comparison means coupled to said first pulse detector means and said second pulse detector means, and coupled to said clock input for applying detected pulses from said first pulse detector means thereto during the time between transmission of and receiving a pulse from said object, said comparision means also coupled to said switching means for controlling said switching means to pass a laser pulse a predetermined time after a first laser pulse is detected by said first pulse detector means.

* * * * *